(12) United States Patent
Das et al.

(10) Patent No.: US 11,354,247 B2
(45) Date of Patent: Jun. 7, 2022

(54) DEVICES, SYSTEMS, AND METHODS FOR CONFIGURING A STORAGE DEVICE WITH CACHE

(71) Applicant: SMART IOPS, INC., Milpitas, CA (US)

(72) Inventors: Ashutosh Kumar Das, Cupertino, CA (US); Manuel Antonio d'Abreu, El Dorado Hills, CA (US)

(73) Assignee: SMART IOPS, INC., Milpitas, CA (US)

(*) Notice: Subject to any disclaimer, the term of this patent is extended or adjusted under 35 U.S.C. 154(b) by 49 days.

(21) Appl. No.: 16/188,944

(22) Filed: Nov. 13, 2018

(65) Prior Publication Data

US 2019/0146923 A1 May 16, 2019

Related U.S. Application Data

(60) Provisional application No. 62/584,703, filed on Nov. 10, 2017.

(51) Int. Cl.
*G06F 12/0871* (2016.01)
*G06F 12/0804* (2016.01)
(Continued)

(52) U.S. Cl.
CPC ...... *G06F 12/0871* (2013.01); *G06F 12/0246* (2013.01); *G06F 12/0661* (2013.01);
(Continued)

(58) Field of Classification Search
CPC ............. G06F 12/0246; G06F 12/0661; G06F 12/0804; G06F 12/0871; G06F 12/0893;
(Continued)

(56) References Cited

U.S. PATENT DOCUMENTS 5,539,895 A * 7/1996 Bishop ................... G06F 12/08
711/117
6,904,490 B2 6/2005 Arimilli et al.
(Continued)

OTHER PUBLICATIONS

A Distributed Reconfigurable Active SSD Platform for Data Intensive Applications; Abbani et al.; IEEE International Conference on High Performance Computing and Communications; Sep. 2-4, 2011 (year: 2011).
(Continued)

*Primary Examiner* — Yaima Rigol
(74) *Attorney, Agent, or Firm* — Willink & Hunt LLP; Marcus T. Hunt

(57) ABSTRACT

In certain aspects, one or more solid-state storage devices (SSDs) are provided that include a controller and non-volatile memory coupled to the controller. The non-volatile memory can include one or more portions configured as main memory or cache memory. When data stored in the main memory is written to the cache memory for processing, the data in the main memory is erased. In certain aspects, storage systems are provided that include one or more of such SSDs coupled to a host system. In certain aspects, methods are provided that include: receiving, by a first such SSD, a first command to write data to memory; determining that the data is stored in a main memory and is to be written to the cache memory for processing; writing the data to the cache memory; and erasing the data from the main memory.

24 Claims, 9 Drawing Sheets

(51) Int. Cl.
  *G06F 12/06* (2006.01)
  *G06F 12/0893* (2016.01)
  *G06F 12/02* (2006.01)
(52) U.S. Cl.
  CPC ...... *G06F 12/0804* (2013.01); *G06F 12/0893* (2013.01); *G06F 2212/2024* (2013.01); *G06F 2212/284* (2013.01); *G06F 2212/7202* (2013.01); *G06F 2212/7203* (2013.01); *G06F 2212/7205* (2013.01); *G06F 2212/7206* (2013.01)
(58) Field of Classification Search
  CPC ....... G06F 2212/2024; G06F 2212/294; G06F 2212/7202; G06F 2212/7203; G06F 2212/7205; G06F 2212/7206
  See application file for complete search history.

(56) References Cited

U.S. PATENT DOCUMENTS

| | | | |
|---|---|---|---|
| 7,593,974 | B2 | 9/2009 | Suzuki et al. |
| 8,112,395 | B2 | 2/2012 | Patel et al. |
| 8,429,373 | B2 | 4/2013 | Acedo et al. |
| 9,244,831 | B2 | 1/2016 | Maghraoui et al. |
| 9,442,669 | B2 | 9/2016 | Nicolae |
| 9,507,664 | B2 | 11/2016 | Ogihara |
| 9,530,491 | B1 | 12/2016 | Uttarwar et al. |
| 9,547,593 | B2 | 1/2017 | Tran |
| 9,600,192 | B2 | 3/2017 | Chambliss et al. |
| 9,740,416 | B2 | 8/2017 | Chambliss et al. |
| 9,990,301 | B1* | 6/2018 | Kanaujia ............ G06F 12/0893 |
| 10,031,819 | B2 | 7/2018 | Banerjee et al. |
| 10,222,984 | B1 | 3/2019 | O'Brien et al. |
| 10,372,349 | B2 | 8/2019 | Xu et al. |
| 10,552,085 | B1* | 2/2020 | Chen ..................... G06F 3/0655 |
| 2002/0026549 | A1 | 2/2002 | Powers et al. |
| 2002/0184460 | A1* | 12/2002 | Tremblay .............. G06F 9/3824 711/167 |
| 2006/0004957 | A1 | 1/2006 | Hand et al. |
| 2007/0283081 | A1* | 12/2007 | Lasser ................. G06F 12/0246 711/103 |
| 2008/0109592 | A1* | 5/2008 | Karamcheti .......... G06F 9/5016 711/103 |
| 2008/0147962 | A1* | 6/2008 | Diggs ................. G06F 11/1456 711/103 |
| 2008/0215952 | A1 | 9/2008 | Bae |
| 2008/0288716 | A1 | 11/2008 | Arakawa |
| 2009/0006760 | A1 | 1/2009 | Bartley et al. |
| 2009/0024734 | A1 | 1/2009 | Merbach et al. |
| 2009/0172333 | A1 | 7/2009 | Marcu et al. |
| 2009/0172498 | A1* | 7/2009 | Shlick ................. G06F 11/1064 714/764 |
| 2009/0235015 | A1* | 9/2009 | Hatsuda .............. G06F 12/0866 711/103 |
| 2010/0122148 | A1 | 5/2010 | Flynn et al. |
| 2010/0174847 | A1* | 7/2010 | Paley .................. G06F 12/0246 711/103 |
| 2011/0060927 | A1 | 3/2011 | Fillingim et al. |
| 2011/0077749 | A1 | 3/2011 | Shang et al. |
| 2012/0246391 | A1* | 9/2012 | Meir ................... G11C 16/349 711/103 |
| 2013/0124794 | A1 | 5/2013 | Bux et al. |
| 2013/0290277 | A1 | 10/2013 | Chambliss et al. |
| 2014/0143481 | A1 | 5/2014 | Asnaashari et al. |
| 2014/0337665 | A1 | 11/2014 | Ogihara |
| 2015/0081983 | A1 | 3/2015 | Ries et al. |
| 2015/0117107 | A1 | 4/2015 | Sun et al. |
| 2015/0154216 | A1 | 6/2015 | Maybee et al. |
| 2015/0317091 | A1 | 11/2015 | Hussain et al. |
| 2015/0347302 | A1* | 12/2015 | Hagersten ........... G06F 12/0862 711/122 |
| 2016/0062696 | A1 | 3/2016 | Cerrelli et al. |
| 2016/0118132 | A1 | 4/2016 | Prins et al. |
| 2016/0179371 | A1 | 6/2016 | Sinclair |
| 2016/0179386 | A1 | 6/2016 | Zhang |
| 2017/0220487 | A1* | 8/2017 | Jung .................. G06F 12/1408 |
| 2019/0087328 | A1 | 3/2019 | Kanno et al. |
| 2020/0097216 | A1 | 3/2020 | Marcu et al. |
| 2020/0104067 | A1 | 4/2020 | Shaharabany et al. |

OTHER PUBLICATIONS

U.S. Appl. No. 15/904,080, filed Feb. 23, 2018, Office Action dated Jul. 24, 2020; Office Action dated Dec. 12, 2019; Office Action dated Sep. 6, 2019; Office Action dated Dec. 4, 2018.
U.S. Appl. No. 15/810,001 now U.S. Pat. No. 10,394,474, filed Nov. 10, 2017, Office Action dated Oct. 5, 2018.
U.S. Appl. No. 16/509,142, filed Jul. 11, 2019, No Office Action cited to date.
U.S. Appl. No. 15/904,080, filed Feb. 23, 2018, Office Action dated Mar. 4, 2021.
A. Ali, M. A. R. Saghir, H. Akkary, H. Artail, H. Hajj and M. Awad, "RASSD: A dynamically reconfigurable active storage device for energy efficient data analytics," 2013 4th Annual International Conference on Energy Aware Computing Systems and Applications (ICEAC), Istanbul, Turkey, 2013, pp. 81-86 (Year: 2013).
An operating system for a Reconfigurable Active SSD processing node; Ali et al.; 19th International Conference on Telecommunications; Apr. 23-25, 2012 (year: 2012).
Exploiting Sequential and Temporal Localities to Improve Performance of NAND Flash-Based SSDs; Lee et al.; ACM Transactions on Storage, vol. 12, iss. 3, Article No. 15; Jun. 2016 (Year: 2016).
SSDExplorer: A Virtual Platform for Performance/Reliability-Oriented Fine-Grained Design Space Exploration of Solid State Drives; Zuolo et al.; IEEE Transactions on Computer-Aided Design of Integrated Circuits and Systems, vol. 34, iss. 10, pp. 1627-1638; Oct. 2015 (Year: 2015).
U.S. Appl. No. 15/904,080, filed Feb. 23, 2018, Office Action dated Aug. 19, 2021.

* cited by examiner

DEVICES, SYSTEMS, AND METHODS FOR CONFIGURING A STORAGE DEVICE WITH CACHE

CROSS-REFERENCE TO RELATED APPLICATIONS

This application claims benefit under 35 U.S.C. § 119(e) of U.S. Provisional Application No. 62/584,703, filed Nov. 10, 2017, the entirety of which is incorporated herein by reference.

FIELD

The present disclosure relates generally to the field of storage, and more particularly to storage devices and systems having cache capability.

BACKGROUND

With advances in computing and storage systems, data storage devices may need to support different usage schemes to be effective. For instance, users may have unique performance requirements and the storage device may need to support these in real time.

Current solid-state storage devices (SSD) provide a single level of data access, and a homogeneous view of memory and data storage. With just a single level of data access to the user, the user has no way to manage the data so as to have different access performance for different types of data. In a computing system, data is categorized as non-volatile and volatile data. Non-volatile data resides in non-volatile memories in permanent data storage devices, such as SSDs or other non-volatile medium. On the other hand, volatile data resides in volatile memories, such as SRAM or DRAM. During operations, non-volatile data is often copied to the volatile memory to provide the computer processor a much faster access to the data. The data in the volatile memory is a copy of the original data in the non-volatile memory of the permanent data storage device. The copy of the data in volatile memory is known as "cached data" and the volatile memory is referred to as the "cache memory." When the copy of the data in the cache memory is modified (e.g., by the computer processor), the original data in the permanent storage (e.g., SSD) will be updated with the modified data copy from the cache memory. The cache memory does not add to the storage capacity of the permanent storage memory (e.g., SSD) because it holds duplicate copies of data stored in the permanent storage memory.

SUMMARY

In certain aspects of the present disclosure, a solid-state storage device (SSD) is provided that includes a controller; and non-volatile memory coupled to the controller. The non-volatile memory includes: a first portion of the non-volatile memory configured as a main memory; and a second portion of the non-volatile memory configured as a first cache memory. The controller is configured such that when data stored in the main memory is written to the first cache memory for processing, the data in the main memory is erased or otherwise considered erased and available to be rewritten with new data.

In certain aspects, a storage system is provided and includes: a host system; a first solid-state storage device (SSD) communicatively coupled to the host system; and a second SSD communicatively coupled to the host system. The first SSD includes: a first controller; and first non-volatile memory coupled to the first controller, wherein at least a portion of the first non-volatile memory is configured as a first main memory. The second SSD includes: a second controller; and second non-volatile memory coupled to the second controller. At least a portion of the second non-volatile memory is configured as a first cache memory. The first and second controllers are configured such that when data stored in the main memory is written to the first cache memory for processing, the data in the first main memory is erased or otherwise considered erased and available to be rewritten with new data.

In certain aspects, a method is provided and includes receiving, by a first solid-state storage device (SSD), a first command to write data to memory. The first SSD includes: a first controller; and first non-volatile memory coupled to the first controller. At least a portion of the first non-volatile memory is configured as a first cache memory. The method further includes: determining, by the first controller, that the data is stored in a main memory and is to be written to the first cache memory for processing; writing the data to the first cache memory; and erasing the data from the main memory or otherwise considering the data erased and available to be rewritten with new data.

BRIEF DESCRIPTION OF THE DRAWINGS

For a better understanding of at least an embodiment, reference will be made to the following Detailed Description, which is to be read in conjunction with the accompanying drawings, wherein.

DETAILED DESCRIPTION

Figure 1:
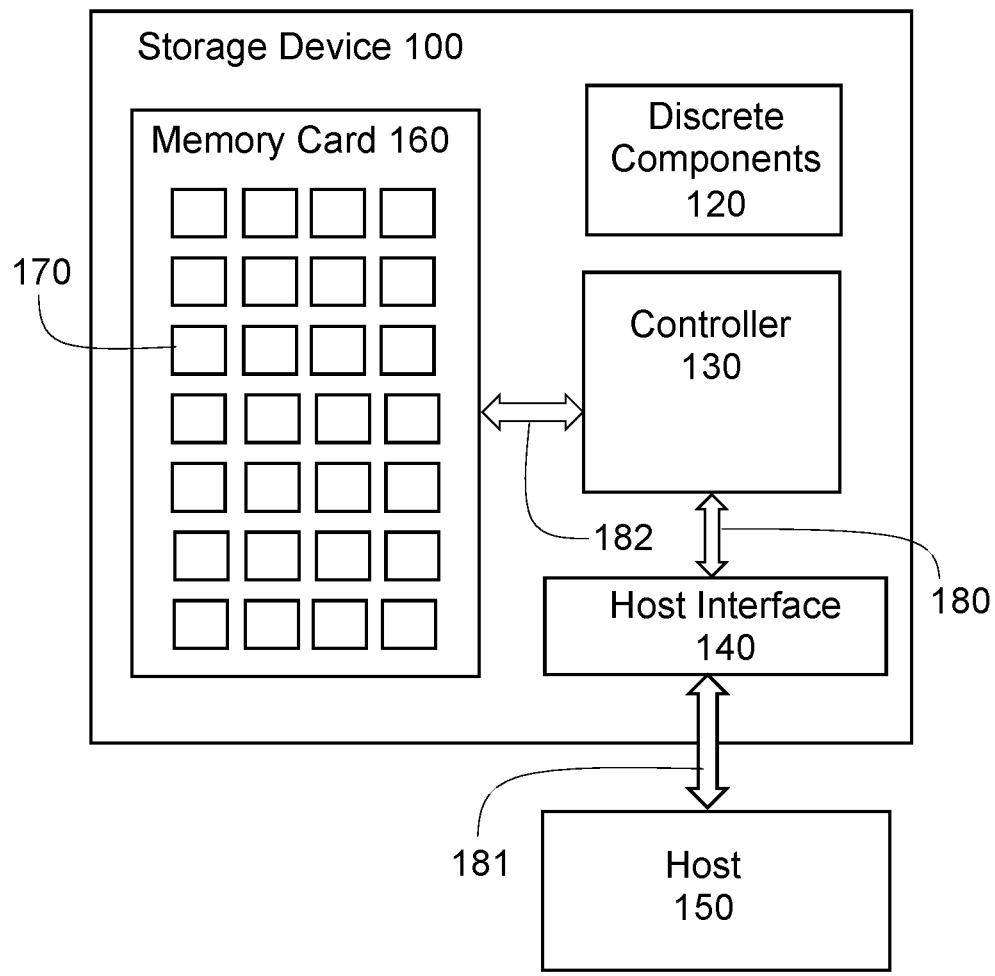
FIG. 1 illustrates a block diagram of an example storage device based on a centralized controller, according to an embodiment.

Before aspects of the present disclosure are described below with reference to the drawings in the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

As stated above, non-volatile data is traditionally often copied to the volatile memory to provide a computer processor with much faster access to the data. In such traditional systems, the cache memory does not add to the storage capacity of the permanent storage memory (e.g., the SSD). In certain aspects, the present disclosure provides devices, systems, and methods that enable cache memory to be part of the permanent storage (SSD), and in some embodiments have the cache memory add to the capacity of the permanent storage.

In certain embodiments, a computing system may include a server and one or more storage devices (or subsystems). A storage device is typically composed of a solid-state drive (or device) (SSD). In certain aspects, the present disclosure provides devices, systems, and methods related to one or more storage devices, such as one or more SSDs, that can be customized to support specialized embedded (or integrated) caching mechanisms based on user needs. In certain aspects, the present disclosure provides for an SSD architecture that supports multiple embedded cache mechanisms aimed for various performance requirements, such as latency, capacity, IOPS, and media type. It should be appreciated that reference to an SSD is used broadly herein and can refer to a stand-alone SSD device or embedded SSD device.

In certain aspects, the present disclosure describes devices, systems, and methods of accessing stored data in a storage device using specific access modes to achieve the desired read/write performance. This can be used in programming data to, or reading data from, a storage system, a memory card, or a set of memory cards, according to the use of an architecture using a centralized or distributed controller scheme for performing the function. For example, a controller of a data storage device may receive a data packet to be stored in a number of memory devices. The controller may partition the data word into multiple portions and the multiple portions may be interleaved across multiple memory devices. Also, the controller may simultaneously start parallel reads from several memory devices. Additionally, prior to the multiple data packets being stored into, or read from, the memory card, or storage system, a logical address corresponding to the data packets may be mapped to multiple physical addresses that indicate where each of the multiple data packets is to be stored in, or read from, the memory card or storage system. The writing of data and reading of data can be performed simultaneously across several memory cards in the storage system using a distributed control architecture. In addition, the storage device may be configured as to have storage areas, blocks, and memory partitions, to operate with different performance so as to increase the performance of the data access. These various configured partitions can be seen as providing "cache" capabilities internal to the storage device or SSD.

The subject matter of the present disclosure may be applicable to a wide range of areas, including, but not limited to, storage, networking, communication and computing systems, appliances on the Internet, remotely controlled appliances, and design of reliable systems. In certain aspects, a computing system includes a server and a storage subsystem. The storage subsystem can be typically composed of one or more solid-state drives (SSDs). In certain embodiments, the present disclosure provides devices, systems, and methods related to one or more storage devices, such as one or more SSDs, that can be customized to support specialized embedded caching mechanisms based on user needs. In certain aspects, the present disclosure provides for a SSD architecture that supports the multiple embedded cache mechanisms aimed for various performance requirements, such as latency, capacity, IOPS, and media type.

FIG. 1 illustrates a block diagram of an example storage device based on a centralized controller, according to an embodiment. In FIG. 1, a storage device 100 is shown including discrete components 120, a controller 130, a host interface 140, and one or more memory cards 160. In an embodiment, the discrete components 120, the controller 130, the host interface 140, the memory card 160 may be implemented on a main board of the storage device for instance. The storage device 100 includes a bus 180 that connects the controller 130 to the host interface 140, and a bus 182 which the controller 130 uses to manage memory devices in the memory card 160. The storage device 100 of FIG. 1 communicates with a host 150 through a communication interface 181. The communication interface 181 may, for instance, be a PCIe, SATA, USB, Open CAPI, or any other standard or proprietary interface. The controller 130 manages the communication to the host 150, the access to the NVM, and the memory management software. In one embodiment, the storage device 100 can include (or correspond to) an SSD.

The memory card 160 includes an array of memory devices, of which a memory device 170 is a representative device. For the sake of clarity and brevity, all of the memory devices may also be collectively referred to herein as "the memory devices 170." The memory card 160 may include a large number of memory devices 170. The memory devices 170 may include, for example, Flash, ReRam, MRAM, any other non-volatile memory (NVM) technology, or a combination of different technology devices. In certain embodiments, the memory card 160 can include a set of the memory devices 170 configured to perform as high performance memory devices, and thus provide an internal "cache" memory capability. For example, during the initialization of the system, a set of the memory devices can be designated as being used for caching purposes. The high performance cache memory can be utilized for storing temporary data, or as a staging place for data from the main memory, for instance.

The discrete components 120 may be implemented to assist with the operation of the storage device 100, and may include passive components such as capacitors, resistors, and inductors, as well as active components such as diodes and transistors. This list of components is an illustrative list and not an exhaustive list.

In certain embodiments, the storage device 100 may operate in data centers where usage encompasses several scenarios. Some of the data may be accessed frequently and is "hot", while other data may be accessed infrequently and is practically "cold". Therefore, "hybrid" requirements may be present for the storage device 100 to accommodate (or account for). To accommodate the hybrid requirements, storage device 100 supports technology that can be tailored to different usage scenarios. In alternative embodiments, instead of having a centralized control strategy, which would not adequately accommodate the hybrid requirements, the storage device 100 may include distributed data control, while having the controller 130 function as the main controller that manages host accesses, memory management, and other background tasks.

The controller 130 shown in FIG. 1 may include an error correction code (ECC) engine (not shown). The controller 130 may be configured to support ECC and memory management schemes specific to the technology used by the memory device 170. In certain embodiments, the memory card 160 can be configured as to have a set of the memory devices 170 configured to perform as high performance memory devices, and thus provide an internal "cache" memory capability.

Figure 2:
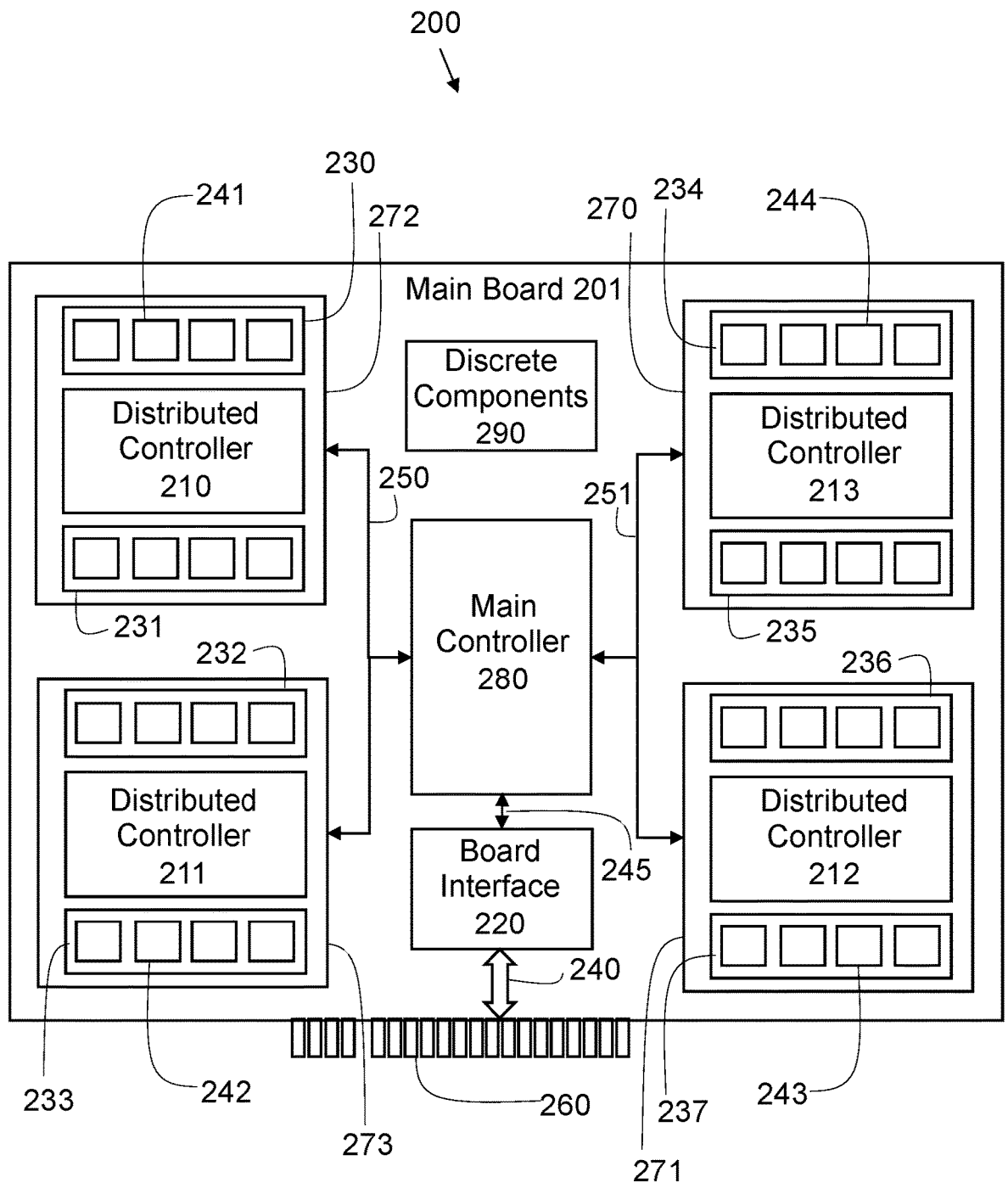
FIG. 2 illustrates a block diagram of an example storage device based on a distributed control architecture, according to an embodiment.

FIG. 2 illustrates a block diagram of an example storage device based on a distributed control architecture, according to an embodiment. In FIG. 2, a storage device 200 is shown including discrete components 290, a main controller 280, a board interface 220, and four memory modules 270, 271, 272 and 273 on a main board 201. A different number of memory blocks than four may be implemented in other embodiments. Each of the memory modules 270, 271, 272 and 273 is managed by the distributed controllers 213, 212, 210, and 211, respectively. Each of the distributed controllers 210, 211, 212, and 213 manages respective memory banks in its domain. In the example embodiment shown in FIG. 2, the distributed controller 213 manages memory banks 234 and 235; the distributed controller 212 manages memory banks 236 and 237; the distributed controller 210 manages memory banks 230 and 231; and the distributed controller 211 manages memory banks 232 and 233. A different number of memory banks may be managed by any distributed controller in other embodiments. In one embodiment, the storage device 200 may include an SSD.

Each memory bank 231, 232, 233, 234, 235, 236, and 237 can have one or more memory devices. The memory banks 230 and 231 are shown having memory devices 241; the memory banks 232 and 233 are shown having memory devices 242; the memory banks 234 and 235 are shown having memory devices 244; and the memory banks 236 and 237 are shown having memory devices 243. The memory devices 241, 242, 243, and 244 shown are exemplary and are not an exhaustive list. Each memory bank, such as memory bank 230, can have several memory devices, and can have a different number of memory devices than shown in the example embodiment of FIG. 2. One feature of the storage device 200 is that each of the memory banks 230, 231, 232, 233, 234, 235, 236, and 237 can be of a different technology. The main controller 280 communicates with the memory banks 230, 231, 232, 233, 234, 235, 236, and 237 via busses 250 and 251. The main controller 280 communicates with the board interface 220 of FIG. 2 via bus 245. The board interface 220 is coupled to a host interface 260 via a bus 240. The host interface 260 is not limited to a particular interface and may vary in different embodiments. For example, in one illustrative embodiment, the host interface 260 is a PCIe connector.

The memory modules 270, 271, 272 and 273 can be mounted directly on the main board 201 of FIG. 2. In another embodiment, memory card modules can be attached to the main board 201 via sockets and ribbons connectors. The control of the various memory banks is transparent to the host or server. The distributed controllers 210, 211, 212, and 213 shown in FIG. 2 may include an error correction code (ECC) engine. The distributed controllers 210, 211, 212, and 213 may be configured to support ECC and memory management schemes specific to the technology used by the memory modules 270, 271, 272, and 273. The memory devices 241, 242, 243, and 244 are illustrative examples of memory devices used in the memory banks 230, 231, 232, 233, 234, 235, 236, and 237. The number of memory devices implemented in a memory bank is not restricted to the number shown in FIG. 2. Other embodiments may include a different number of memory devices in each memory bank of each memory module. The memory modules 270, 271, 272 and 273 may include, for example, Flash, ReRam, MRAM, any other non-volatile memory (NVM) technology, or a combination of different technology devices.

Figure 3:
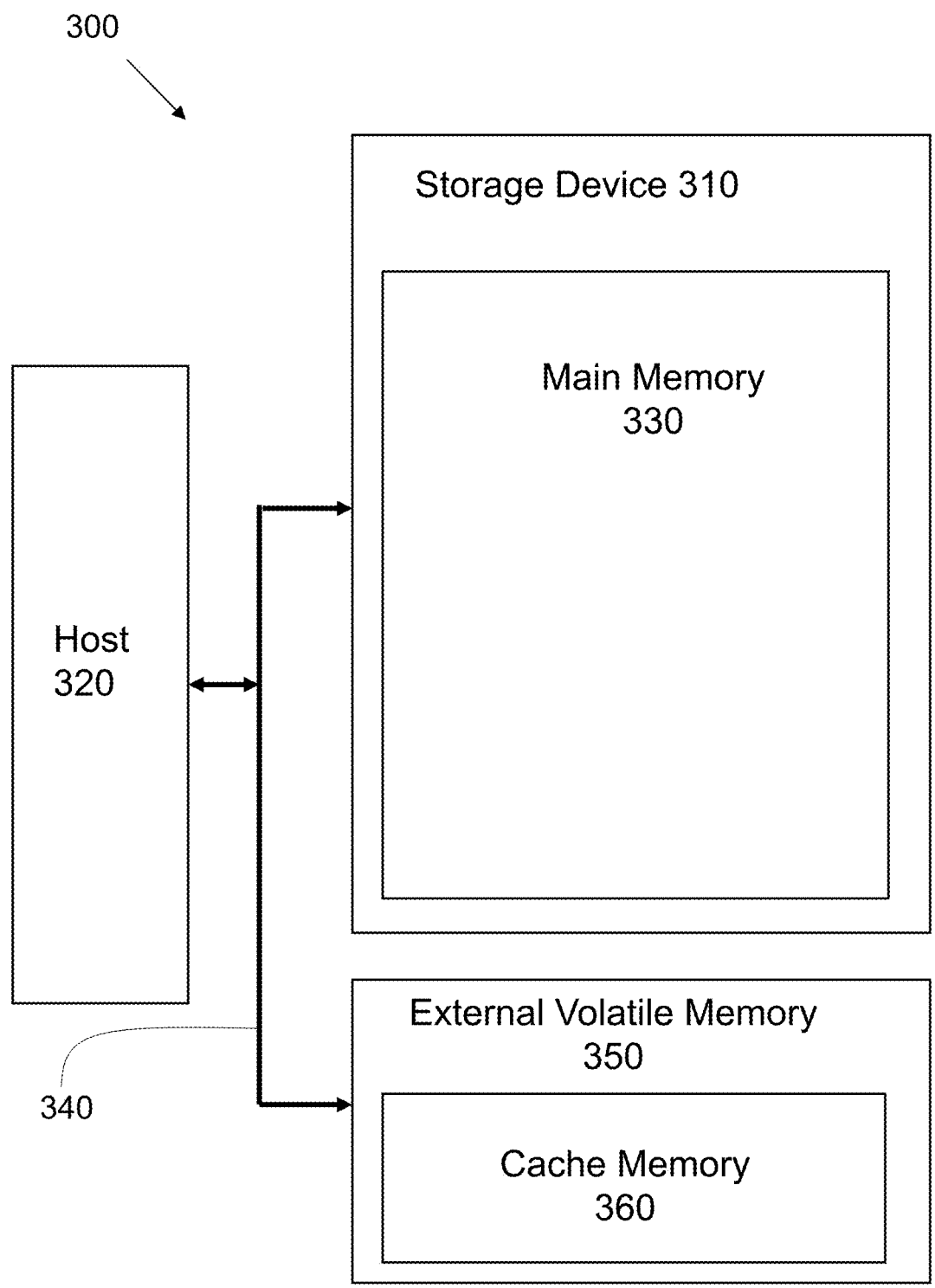
FIG. 3 illustrates a block diagram of an example computing system including a storage device and external volatile memory configured as "cache" memory, according to the prior art.

FIG. 3 illustrates a block diagram of an example computing system including a storage device and an external volatile memory configured as cache, according to the prior art. In FIG. 3, a computing system 300 is shown including a host 320, a storage device 310, and an external volatile memory 350. The external volatile memory 350 includes cache memory 360, which may be used for temporary storage and operation of data. The storage device 310 includes a main memory 330. The host 320 communicates with the storage device 310 (e.g., the main memory 330) and the external volatile memory 350 (e.g., the cache memory 350) via a bus 340.

The main memory 330 includes non-volatile memory, which can include Flash, ReRam, MRAM, any other non-volatile memory (NVM) technology, or a combination of different technology devices. The storage device 310 also includes a management structure, such as a controller, and may also include peripheral supporting devices (not shown in FIG. 3), such as discrete components, interface blocks, power devices, etc. The external volatile memory 350 includes volatile memory, such as SRAM or DRAM, to provide a high performance "cache" memory 360. The high performance cache memory 360 may be utilized for storing temporary data, or as a staging place for data from the main storage device 310, for instance. Traditionally, when the host 320 processes (or works with) data from the storage device 310, a copy of the data is saved on the cache memory 360 for fast access. The storage device 310 retains the duplicate original data, and once the host 320 is done processing the temporary data in the cache memory 360, the storage device 310 is updated with the new version of the data from the cache memory 360.

Figure 4:
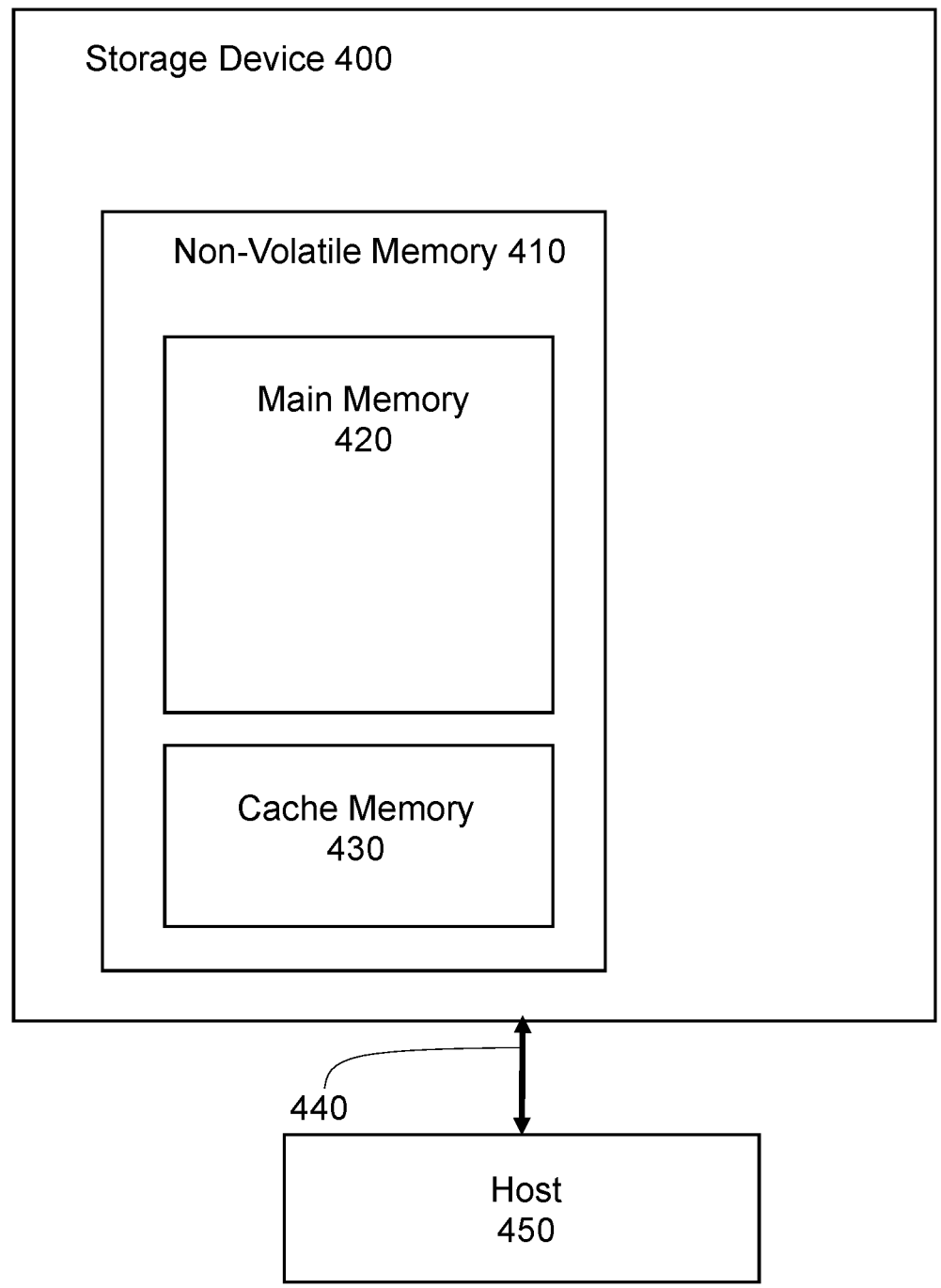
FIG. 4 illustrates a block diagram of an example storage system with a storage device having a partition (or portion, section, area, etc.) of non-volatile memory designated as cache memory, according to an embodiment, according to an embodiment.
Figure 5:
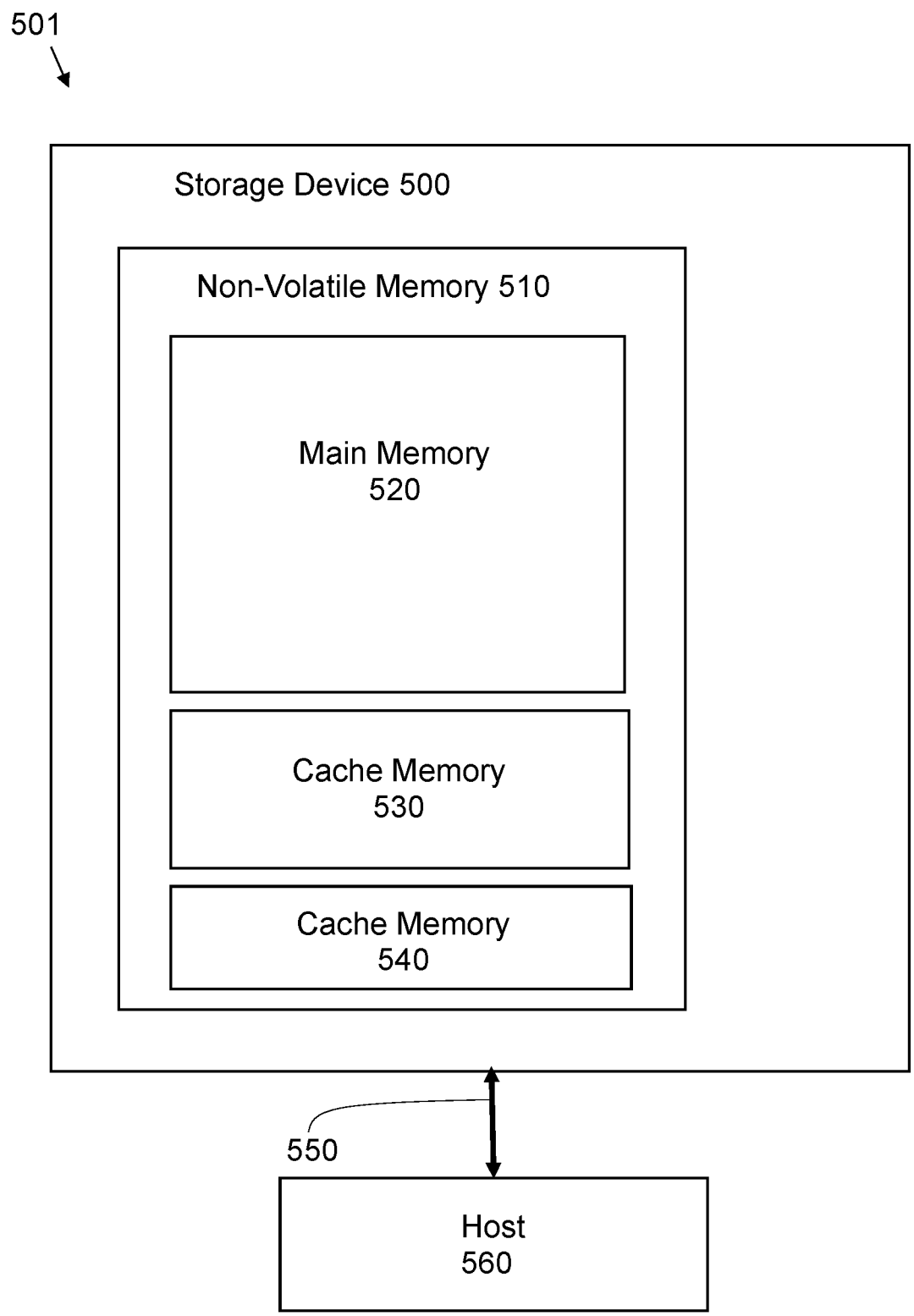
FIG. 5 illustrates a block diagram of an example storage system with a storage device having multiple memory sections designated as cache memories, according to an embodiment.

FIGS. 4-6 illustrate various computing systems having one or more storage devices configured with various implementations of main memory and non-volatile cache memory, in accordance with various embodiments of the present disclosure. It should be appreciated that for the sake of clarity and brevity, not all components of the storage device 400 are shown. For example, the storage devices shown in FIGS. 4 through 6 can include additional components, such as one or more controllers, interfaces, memory devices, discrete components, etc. In an embodiment, the each of the storage devices of FIGS. 4 through 6 can be implemented as the storage device 100 of FIG. 1 or the storage device 200 of FIG. 2.

FIG. 4 illustrates a block diagram of an example storage (or computing) system with a storage device having a partition (or portion, section, area, etc.) of non-volatile memory designated as cache memory, according to an embodiment. In FIG. 4, a storage system 401 is shown including a storage device 400 and a host (or host device) 450. The storage device 400 is shown including a non-volatile memory 410. A partition of the non-volatile memory 410 is designated as a main memory 420 and another partition of the non-volatile memory 410 is designated as a cache memory 430. The main memory 420 functions as a regular storage non-volatile memory. The embedded (or integrated) cache memory 430 functions as a high performance cache memory—e.g., with a high data access performance. The high performance cache memory can be utilized for storing temporary data, or as a staging place for data from the main memory, for instance.

The partition of the non-volatile memory 410 that has been designated as the cache memory 430 has its memory components configured to perform at higher rates when compared with the regular non-volatile memory of the main memory 420. The cache memory 430 can have beneficial attributes, such as low latency, high IOPS (TO operations per second), capacity, and media type (e.g., thumbdrives, compact flash, SD cards, etc.). This is not an exhaustive list of attributes but serves as examples. In one embodiment, the storage device 400 includes (or corresponds to) an SSD.

The storage device 400 is shown communicatively coupled to the host 450 via a bus 440. The host 450 communicates with the storage device 400 (e.g., the main memory 420 and the cache memory 430) via the bus 440. In an embodiment, the host is a compute server. The bus 440 may include, for example, a PCIe, SATA, USB, Open CAPI, or any other standard or proprietary interface.

In an embodiment, the storage device 400 can include the centralized control architecture of the storage device 100 of FIG. 1. The non-volatile memory 410 can include the memory card 160 having the memory devices 170, which can include Flash, ReRAM, MRAM, any other non-volatile memory (NVM) technology, or a combination of different technology devices. The memory devices 170 can be partitioned into the main memory and the cache memory. For example, the main memory 420 can be configured using a portion of the memory devices 170, while the cache memory 430 can be configured using a different portion of the memory devices 170. The attributes of the memory devices 170 can be utilized to determine whether better suited for the main memory 420 or the cache memory 430. The attributes can relate to latency, IOPS, capacity, media type, etc., for example.

In another embodiment, the storage device 400 can include the distributed control architecture of the storage device 200 of FIG. 2. For example, the non-volatile memory 410 can include the memory devices 241 through 244 in the memory banks 230 through 237 of the memory modules 270 through 273. The memory devices 241 through 244 can include Flash, ReRAM, MRAM, any other non-volatile memory (NVM) technology, or a combination of different technology devices. The main memory 420 can be configured using a portion of the memory devices 241 through 244 to form the main memory partition. The cache memory 430 can be configured using a different portion of the memory devices 241 through 244 to form the cache memory partition.

The main memory partition and the cache memory partition can be formed in a variety of manners as desired. For example, in one embodiment, the main memory 420 and the cache memory 430 can be partitioned on a per memory device basis such that each of the memory devices 241 through 244 can be configured to work as the main memory 420 or the cache memory 430. In this way, for instance, the attributes of the memory devices 241 through 244 can be utilized to determine whether better suited for the main memory 420 or the cache memory 430.

In another embodiment, the main memory 420 and the cache memory 430 can be partitioned on a per memory bank basis such that each of the memory banks 230 through 237 can be configured to work as the main memory 420 or the cache memory 430. In this way, for instance, the attributes of the memory banks 230 through 237 can be utilized to determine whether better suited for the main memory 420 or the cache memory 430.

In yet another embodiment, the main memory 420 and the cache memory 430 can be partitioned on a per module basis such that all of the memory devices on a memory module are configured to work as the main memory 420 or the cache memory 430. In this way, for instance, the attributes of the memory modules 270 through 273, their respective distributed controllers 210 through 213, or both, can be utilized to determine whether better suited for the main memory 420 or the cache memory 430.

In certain aspects, when data stored in one partition is written to another partition (also referred to herein as being "moved from one partition to another partition," such as from the main memory 420 to the cache memory 430, or vice versa), no copy of the data is retained in the originating partition. For example, the controller on the storage device can erase (or delete) the data from the originating partition or otherwise consider (or treat, function as though, etc.) the data as if it was erased by considering the memory holding the data to be available for new data to be written to once the data is written to the target partition. In this way, there is no loss in the storage capacity since there are not two duplicate copies of the data stored.

In a preferred embodiment, when data is moved to the cache memory 430 from the main memory 420, no copy of the data is retained in the main memory 420. In this way, there is no loss in the storage capacity since there are not two duplicate copies of the data. When the processing of the data in the cache memory 430 is complete, the processed data can be moved to the main memory 420 and erased from the cache memory 430. The cache memory 430 is now available to be programmed with new data that requires manipulation by the host 450.

FIG. 5 illustrates a block diagram of an example storage (or computing) system with a storage device having multiple memory sections designated as cache memories, according to an embodiment. In FIG. 5, a storage system 501 is shown including a storage device 500 and a host (or host device) 560. The storage device 500 is shown including a non-volatile memory 510. One partition of the non-volatile memory 510 is designated as a main memory 520, which functions as regular storage non-volatile memory. Another two partitions of the non-volatile memory 510 are configured as cache memories—a cache memory 530 and a cache memory 540. The embedded cache memories 530 and 540 function as a high performance cache and have memory components configured to perform at higher rates when compared with the regular non-volatile memory of the main memory 520. The high performance cache memory can be utilized for storing temporary data, or as a staging place for data from the main memory, for instance. While the non-volatile memory 510 is shown in FIG. 5 as having two cache memory partitions (the cache memories 530 and 540), it should be appreciated that the number of cache memory partitions is not restricted to what is shown in FIG. 5 and may include more than two cache memory partitions in other embodiments. In one embodiment, the storage device 500 may include an SSD.

The cache memories 530 or 540 can be created such that the memory devices that make up the cache memories 530 and 540 are configured to provide a desired performance, such as a higher performance than provided by the main memory 520. The attributes of the memory devices can be utilized to determine whether better suited for the main memory 520 or the cache memories 530 and 540. The attributes can relate to latency, IOPS, capacity, media type, etc., for example.

The storage device 500 is shown communicatively coupled to the host 560 (e.g., a compute server) via a bus 550. The host 560 communicates with the storage device 500 (e.g., the main memory 520 and the cache memories 530 and 540) via the bus 550. The bus 550 may include, for example, a PCIe, SATA, USB, Open CAPI, or any other standard or proprietary interface.

In an embodiment, the storage device 500 can include the centralized control architecture of the storage device 100 of FIG. 1. For example, the non-volatile memory 510 can include the memory card 160 having the memory devices 170, which can include Flash, ReRAM, MRAM, any other non-volatile memory (NVM) technology, or a combination of different technology devices. The memory devices 170 can be partitioned into the main memory 520 and the cache memories 530 and 540. For example, the main memory 520 can be configured using one portion of the memory devices 170, the cache memory 530 configured using a different portion of the memory devices 170, and the cache memory 540 configured using yet another different portion of the memory devices 170. The attributes of the memory devices 170 can be utilized to determine whether better suited for the main memory 520 or the cache memories 530 and 540.

In another embodiment, the storage device 500 can include the distributed control architecture of the storage device 200 of FIG. 2. For example, the non-volatile memory 510 can include the memory devices 241 through 244 in the memory banks 230 through 237 of the memory modules 270 through 273. The memory devices 241 through 244 can include Flash, ReRAM, MRAM, any other non-volatile memory (NVM) technology, or a combination of different technology devices. The main memory 520 can be configured using a portion of the memory devices 241 through 244 to form the main memory partition. The cache memory 530 can be configured using a different portion of the memory devices 241 through 244 to form a cache memory partition. Further, the cache memory 540 can be implemented using yet another different portion of the memory devices 241 through 244 to form another cache memory partition.

The main memory partition 520 and the cache memory partitions 530 and 540 can be formed in a variety of manners as desired. For example, in one embodiment, the main memory 520 and the cache memories 530 and 540 can be partitioned on a per memory device basis such that each of the memory devices 241 through 244 can be configured to work as the main memory 520 or one of the cache memories 530 and 540. In this way, for instance, the attributes of the memory devices 241 through 244 can be utilized to determine whether better suited for the main memory 520 or the cache memories 530 and 540.

In another embodiment, the main memory 520 and the cache memories 530 and 540 can be configured on a per memory bank basis such that any of the memory banks 230 through 237 can be configured to work as the main memory 520 or one of the cache memories 530 and 540. In this way, for instance, the attributes of the memory banks 230 through 237 can be utilized to determine whether better suited for the main memory 520 or the cache memories 530 and 540.

In yet another embodiment, the main memory 520 and the cache memories 530 and 540 can be partitioned on a per module basis such that each of the memory modules 270 through 273 can be configured to work as the main memory 520 or one of the cache memories 530 and 540. In this way, for instance, the attributes of the memory modules 270, 271, 272, and 273, their respective distributed controllers 210, 211, 212, and 213, or both, can be utilized to determine whether better suited for the main memory 520 or the cache memories 530 and 540.

In certain aspects, when data is moved from one partition to another partition (e.g., the (e.g., from the main memory 520 to one of the cache memories 530 and 540, or vice versa), no copy of the data is retained in the originating partition. For example, the controller in the storage device can erase the data from the originating partition (or otherwise consider the data as if it was erased by considering the memory holding the data to be available for new data to be written to) once the data is written to the target partition. In this way, there is no loss in the storage capacity since there are not two duplicate copies of the data stored.

In a preferred embodiment, the storage device 500 is configured such that as data is moved between partitions of the non-volatile memory 510 (e.g., between the main memory 520, the cache memory 530, and the cache memory 540), there will be only one copy of data stored in the non-volatile memory 510. In such case, the data can be in the main memory 520 or in either of the cache memories 530 and 540 at a given time. For example, when data is moved to one of the cache memories 530 and 540 from the main memory 520, no copy of the data is retained in the main memory 520. In this way, there is no loss in the storage capacity since there are not two duplicate copies of the data stored in the non-volatile memory 510. When the processing of the data in the cache memory 530 or 540 is complete, the processed data can be moved to the main memory 520 and erased from the cache memory 530 or 540. The cache memory 530 or 540 is then available to be programmed with new data that requires manipulation by the host 560.

In certain aspects, a storage system can include multiple storage devices, with each storage device configured to work as main memory, cache memory, or combination thereof. For example, one storage device (e.g., SSD) can include non-volatile memory configured as the main memory of the storage system; another storage device (e.g., SSD) can include non-volatile memory configured as the cache memory; and yet another storage device (e.g., SSD) can include non-volatile memory configured as another cache memory. The non-volatile memory on a storage device can be partitioned as well. For example, one storage device can include main memory and one or more cache memories, such as the storage devices 400 and 500 of FIGS. 4 and 5, respectively.

Figure 6A:
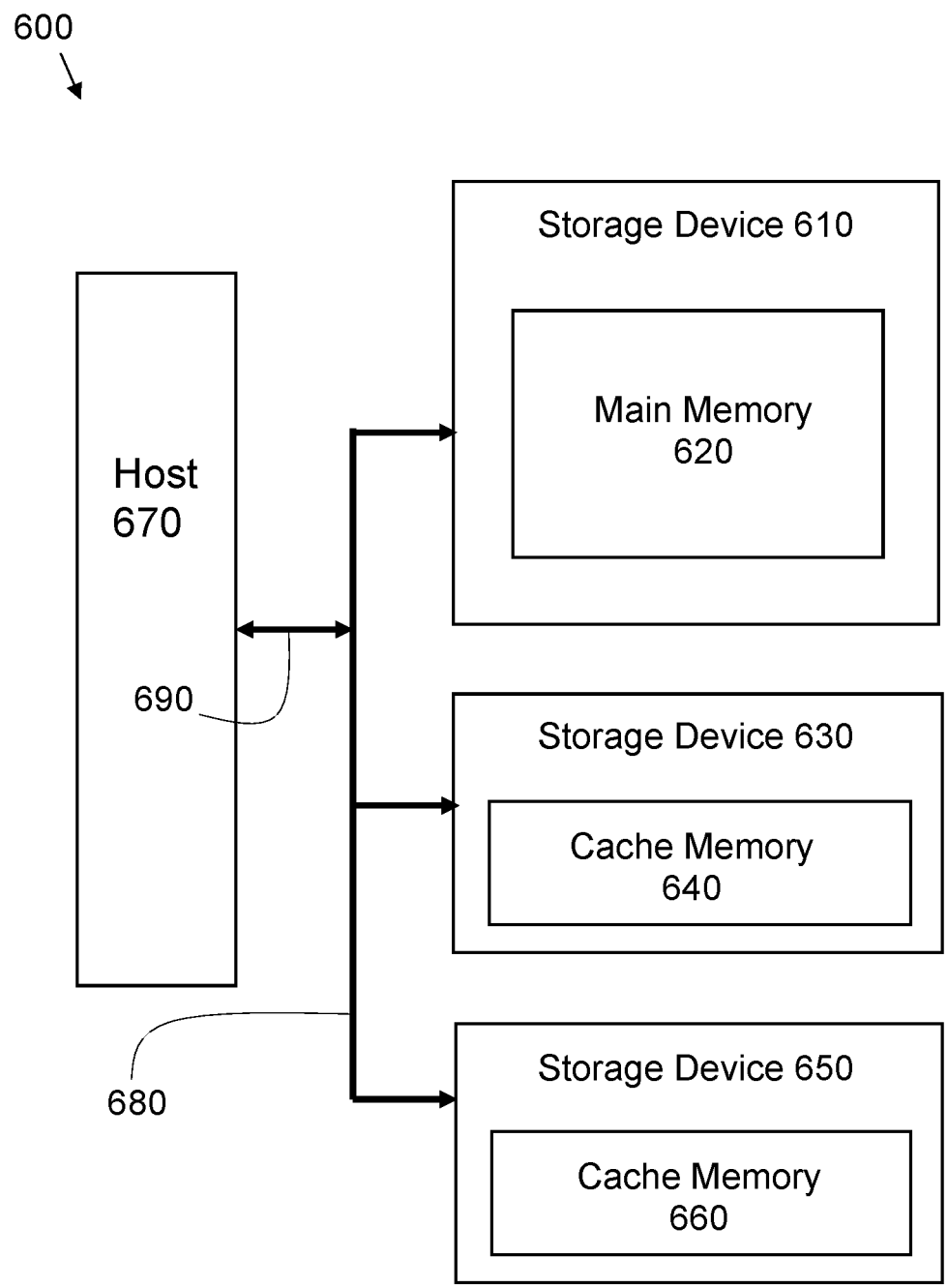
FIG. 6A illustrates a block diagram of an example storage system with multiple non-volatile storage cache memories, according to an embodiment.

FIG. 6A illustrates a block diagram of an example storage system with multiple non-volatile storage cache memories, according to an embodiment. A storage system 600 is shown including a storage device 610, a storage device 630, and a storage device 650. The storage device 610 includes non-volatile memory designated as a main memory 620. The main memory 620 functions as a regular storage non-volatile memory. The storage device 630 includes non-volatile memory designated as a cache memory 640. The storage device 650 includes non-volatile memory designated as a cache memory 660. The cache memories 640 and 660 function as a high performance cache memory and have memory components configured to perform at higher rates when compared with the regular non-volatile memory of the main memory 420. The high performance cache memory can be utilized for storing temporary data, or as a staging place for data from the main memory, for instance. The storage devices 630 and 650 can function as external cache memories for the storage device 610. In an embodiment, the storage system 600 may include more than the three storage devices 610, 630, and 650 shown.

The storage system 600 can include one or more communication interfaces (not shown). For example, the storage devices 610, 630, and 650 can be communicatively coupled to each other via a communication interface 680, such as an electrical bus 680. Another communication interface 690 can enable communication between a host 670 and the storage devices 610, 630, and 650, and may include, for example, a PCIe, SATA, USB, Open CAPI, or any other standard or proprietary interface.

In an embodiment, the storage devices 610, 630, and 650 can include the centralized control architecture of the storage device 100 of FIG. 1, or the distributed control architecture of the storage device 200 of FIG. 2. In an embodiment, one or more of the storage devices 610, 630, and 650 can be implemented as the storage device 400 of FIG. 4 or the storage device 500 of FIG. 5.

Figure 6B:
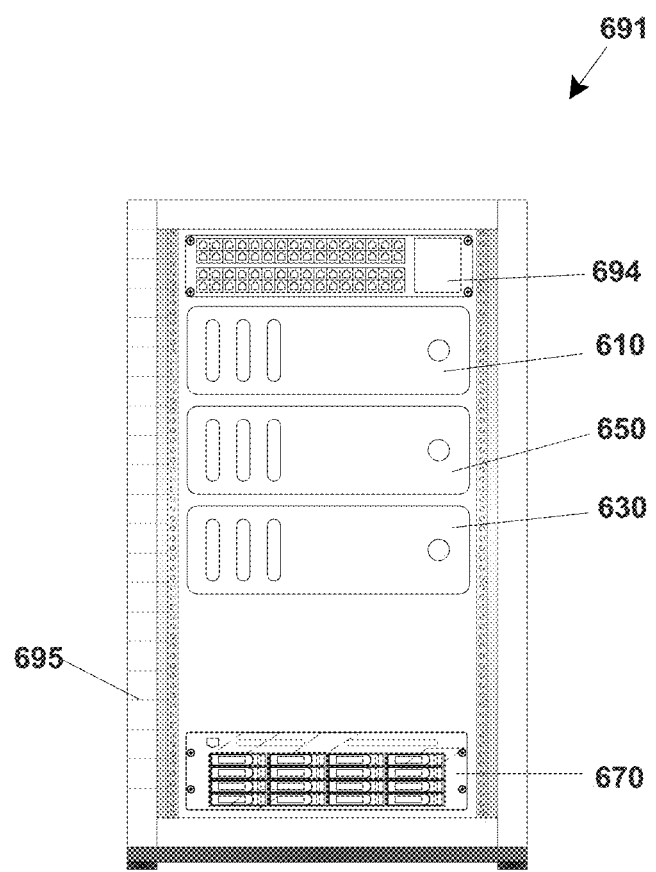
FIG. 6B illustrates a block diagram of an example storage appliance including the multiple non-volatile storage cache memories of FIG. 6A, according to an embodiment.

In an embodiment, one or more of the storage devices 610, 630, and 650 can include an SSD and can be part of a storage appliance having one or more SSDs. For example, FIG. 6B illustrates a block diagram of an example storage appliance including the storage system 600 of FIG. 6A, according to an embodiment. A storage appliance 691 is shown including the storage devices 610, 630, and 650 of FIG. 6A mounted on a frame 695 along with a server or server array 670 (e.g., the host 670 in FIG. 6A). A switch 694 can also be mounted on the frame 695 and be electrically coupled to the server 670 and the storage devices 610, 630, and 650. In such case, the switch 694 and frame 695 can provide the communication interfaces 680 and 690 of FIG. 6A. In such an embodiment, one or more of the SSDs in the storage appliance can be configured to work as the cache memories. In a preferred embodiment of such a configuration, only one copy of the data will be available, either in one of the cache memories or in the main memory of the storage devices 610, 630, and 650. In this way, there will not be any loss in storage capacity due to having data in the cache memories. The total non-volatile memory storage capacity will be the sum of the main storage and the size of all the cache memories.

Figure 7:
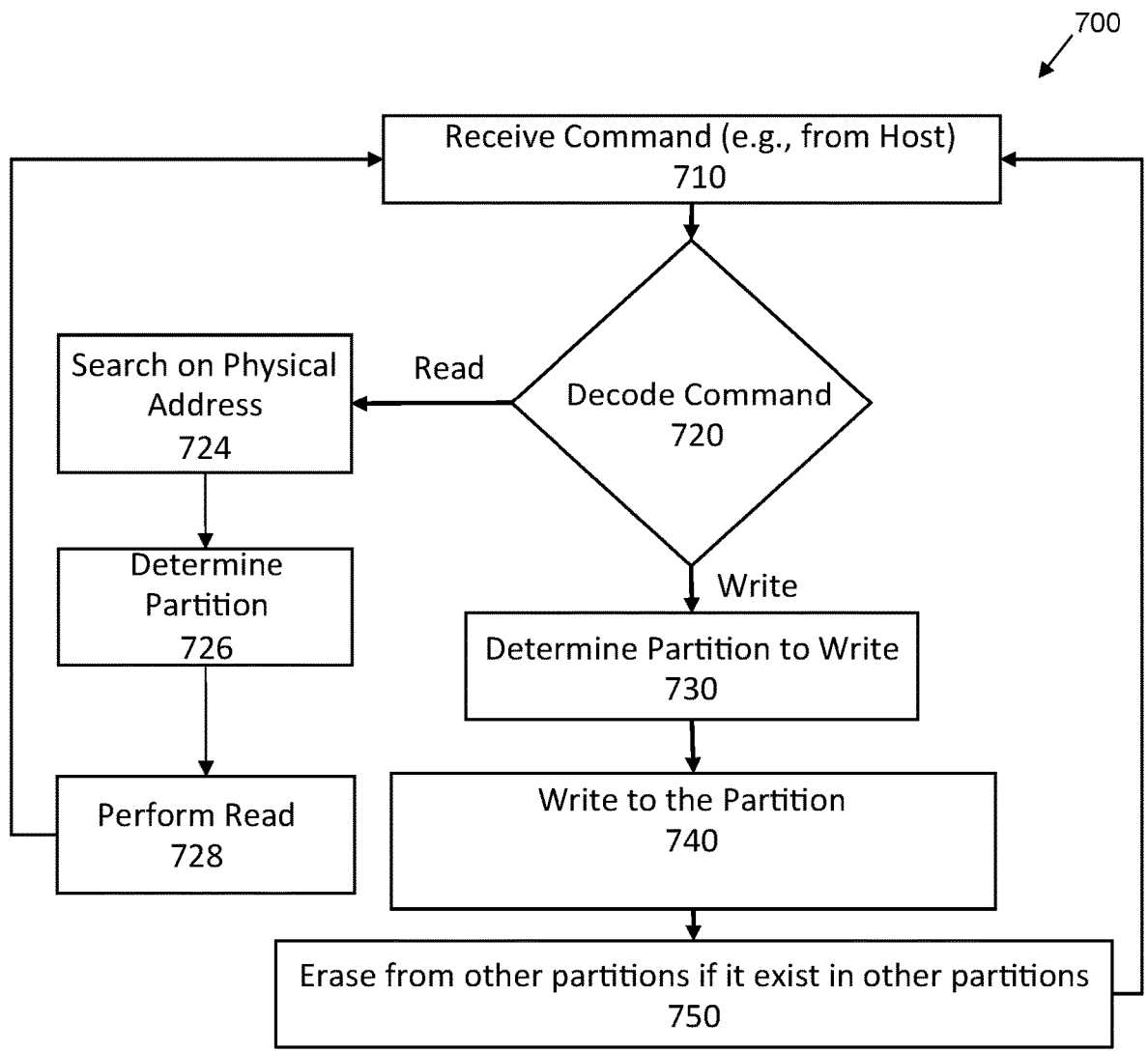
FIG. 7 illustrates a flow chart for an example method of performing a read or write with one or more storage devices having non-volatile memory configured as cache, according to an embodiment.

FIG. 7 illustrates a flow chart for an example method of performing a read or write with one or more storage devices having non-volatile memory configured as cache, according to an embodiment. This is an illustrative embodiment and the procedure can be implemented in a variety of manners without compromising the underlying principles of the disclosure. In an embodiment, the method 700 may be implemented in one of the storage devices and systems described in FIGS. 4 through 6. In such case, references to a "partition" in FIG. 7 may refer to the main memory or one of the cache memories shown in FIGS. 4 through 6. As previously mentioned, the storage devices and systems in FIGS. 4 through 6 can be implemented with a centralized control architecture or distributed control architecture, such as shown in FIGS. 1 and 2. It should be appreciated that the discussion above for similar features and functions of the storage devices of FIGS. 1, 2, and 4 through 6 may also apply to the storage system shown in FIG. 7. For the sake of brevity and clarity, every feature and function applicable to FIGS. 1, 2, and 4 though 6 is not repeated in FIG. 7 or here.

At block 710 of a method 700, a storage device (or system) receives a read or write command from a host. At block 720, the command is decoded to determine if the command is a read or write command. If the command is determined to be a read command, then a search is performed on the physical address for the data to be read, as represented by block 724. At block 726, a determination is made as to identify which partition (e.g., the main memory or one of the cache memories of FIGS. 3 through 6) the physical address is located on. For example, the search can be performed using a page table having the physical addresses stored therein along with the corresponding partitions where the physical addresses are located. At block 728, the data at the physical address on the identified partition is read. In an embodiment, the operations of blocks 710 through 728 can be performed by a controller on the storage device, such as the centralized controller 130 of FIG. 1 or one or more of the controllers 280, 210, 211, 212, and 213 of FIG. 2.

In the example data storage device 100 with centralized controller shown in FIG. 1, the controller 130 can receive and decode the read command from the host 150 (blocks 710 and 720). The controller 130 can perform the search on the physical address for the data to be read (block 724) and determine which partition the physical address is located (block 726). The controller 130 can then read the data at the physical address on the identified partition.

In the example data storage device 200 with distributed controllers in FIG. 2, the main controller 280 can receive and decode the read command from a host (blocks 710 and 720). The controller 280 can perform the search on the physical address for the data to be read (block 724) and determine which partition the physical address is located (block 726). This can include determining which memory devices (241, 242, 243, and 244), memory banks (230, 231, 232, 233, 234, 235, 236 or 237), or memory modules (270, 271, 272, and 273) the physical address is located on. The controller 130 can then read the data at the physical address on the identified partition.

If at block 720, the command is determined to be a write command, then a search is performed at block 730 to determine and select which partition the data is to be written. For example, if the write command is to store the data, then the search is performed to determine and select the appropriate partition configured as the main memory. On the other hand, if the write command is to enable processing of the data (e.g., as indicated in the instructions (or command) by the host), then the search is performed to determine and select the appropriate partition configured as the cache memory. If more than one cache memory partition exists, one can be selected based on various factors, such as which partition has available memory space, or which partition meets the appropriate performance requirements (e.g., latency, capacity, IOPS, media type, etc.), etc. This attribute information can be maintained, for example, in the page table along with the physical addresses and corresponding partitions. At block 740, the data is written to the selected partition. If the data written to the selected partition existed in another partition, then at block 750, the data in the other partition is not maintained (e.g., deleted, erased, or otherwise considered as if erased). For example, if data is transferred from the main memory to one of the cache memories, then the data in the main memory will be erased once the data is written in the cache memory. In this way, there are not duplicate copies of the written data, which would reduce storage capacity. In an embodiment, the operations of blocks 730, 740 and 750 can be performed by a controller on the storage device, such as the centralized controller 130 of FIG. 1 or one or more of the controllers 280, 210, 211, 212, and 213 of FIG. 2.

For example, in the data storage device 100 with centralized controller shown in FIG. 1, the controller 130 can receive and decode the write command from the host 150 (blocks 710 and 720). The controller 130 can perform the search to determine and select which partition the data is to be written (block 730). For instance, the partition can be selected based on the function to be performed on the data and the most appropriate performance attributes to perform the function. For example, if the data is to be stored, then the data can be written to (block 740) the portion of the memory card 160 that is configured as the main memory (e.g., the main memory 420, 520, or 620). If a copy of the data was stored in another partition, then the copy of the data can be erased from the other partition (block 750).

If, on the other hand, the data is to be further processed, then the data can be written to (block 740) a cache memory (e.g., cache memories 430, 530, 540, 640, or 660) having higher performance attributes than the main memory. Once written to the cache memory, the data can be processed accordingly. If the data was originally stored in the main memory, then the controller 130 can erase (block 750) the copy of the data in the main memory once the data is written to the cache memory. In some instances, the processed data can be moved back to the main memory when processing is complete. In such case, for example, the processed data can be written to the main memory and the copy of the processed data in the cache memory can be erased.

In the example data storage device 200 with distributed controllers in FIG. 2, the main controller 280 can receive and decode the write command from the host 150 (blocks 710 and 720). The main controller 280 can perform the search to determine and select which partition the data is to be written (block 730). This can include determining which memory devices (241, 242, 243, and 244), memory banks (230, 231, 232, 233, 234, 235, 236 or 237), or memory modules (270, 271, 272, and 273) are configured as the appropriate partition (e.g., the main memory or the cache memory) to write the data.

For instance, the partition can be selected based on the function to be performed on the data and the most appropriate performance attributes to perform the function (block 730). For example, if the data is to be stored, then the data can be sent to the appropriate memory module (270, 271, 272, or 273) having memory devices configured to work as the main memory (e.g., the main memory 420, 520, or 620). On the other hand, if the data is to be further processed, then the data can be sent to the appropriate memory module (270, 271, 272, or 273) with memory devices configured as the cache memory (e.g., cache memories 430, 530, 540, 640, or 660) having higher performance attributes than the main memory. The respective distributed controller (e.g., 210, 211, 212, or 213) controlling the appropriate memory module can then write the data to a physical address corresponding to the selected cache memory (block 740). If a copy of the data was stored in another partition, then the copy of the data can be erased from the other partition (block 750).

Once written to the cache memory, the data can be processed accordingly. In some instances, the processed data can be moved back to the main memory when processing is complete. In such case, for example, the main controller 280 can instruct a distributed controller to write the processed data to a memory module configured to work (at least partially) as the main memory.

The process may be repeated for subsequent commands received from the host, as represented by the arrows from blocks 717 and 750 back to the block 710. It should be appreciated that in some embodiments, multiple commands can be processed simultaneously by one or more controllers.

It should be appreciated that the data to be read can be stored at more than one physical address, and that the blocks 710 through 728 can also apply to read operations for data stored at more than one physical address. For example, if the data to be read is located at multiple physical addresses, then the search is performed on the physical addresses (block 724), the one or more corresponding partitions are identified, and the data at the physical addresses on the identified partitions is read (block 726). As for write operations, one or more partitions can be determined and selected (block 730) and the data written to multiple physical addresses in one or more selected partitions (block 740).

Figure 8:
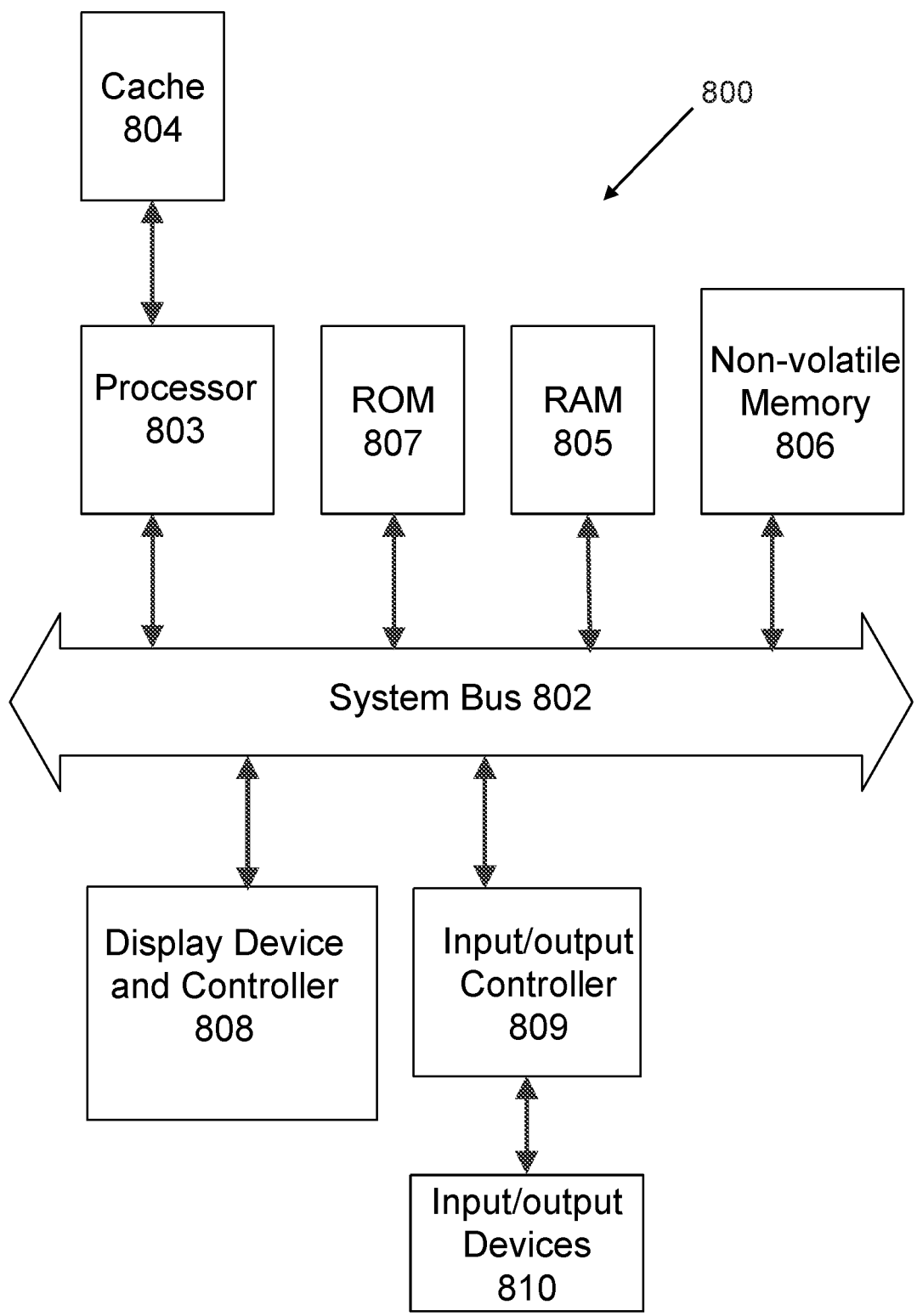
FIG. 8 depicts a block diagram of an exemplary computer system (or data processing system), according to an embodiment.

FIG. 8 depicts a block diagram of an exemplary host system (or computer system), according to an embodiment. Note that while FIG. 8 illustrates various components of a computer system, it is not intended to represent any particular architecture or manner of interconnecting the components. The computer system 800 shown in FIG. 8 may represent an example host system (e.g., one of the hosts described in FIGS. 1 through 7), such as a server for example. It is also be appreciated that networked computers and other data processing systems which have fewer components, or perhaps more components, may also be implemented as the computer system.

As shown, the host system 800 includes a system bus 802, which is coupled to a microprocessor 803, a Read-Only Memory (ROM) 807, a volatile Random Access Memory (RAM) 805, as well as other nonvolatile memory 806. In the illustrated embodiment, microprocessor 803 is coupled to cache memory 804. A system bus 802 can be adapted to interconnect these various components together and also interconnect components 803, 807, 805, and 806 to other devices, such as a display controller and display device 808, and to peripheral devices such as input/output ("I/O") devices 810. Types of I/O devices can include keyboards, modems, network interfaces, printers, scanners, video cameras, or other devices well known in the art. Typically, I/O devices 810 are coupled to the system bus 802 through I/O controllers 809. In one embodiment the I/O controller 809 includes a Universal Serial Bus ("USB") adapter for controlling USB peripherals or other type of bus adapter.

RAM 805 can be implemented as dynamic RAM ("DRAM"), which requires power continually in order to refresh or maintain the data in the memory. The other nonvolatile memory 806 can include a magnetic hard drive, magnetic optical drive, optical drive, DVD RAM, solid-state storage drive, or other type of memory system that maintains data after power is removed from the system. While FIG. 8 shows that nonvolatile memory 806 as a local device coupled with the rest of the components in the host system 800, it will be appreciated by skilled artisans that the described techniques may use a nonvolatile memory remote from the system, such as a network storage device coupled with the host system through a network interface, such as a modem, Ethernet interface, or any other standard or proprietary interface.

EXAMPLE EMBODIMENTS

In certain aspects of the present disclosure, a general implementation of a solid-state storage device (SSD) includes a controller; and non-volatile memory coupled to the controller. The non-volatile memory includes: a first portion of the non-volatile memory configured as a main memory; and a second portion of the non-volatile memory configured as a first cache memory. The controller is configured such that when data stored in the main memory is written to the first cache memory for processing, the data in the main memory is erased or otherwise considered erased and available to be rewritten with new data.

In certain embodiments, the controller is configured such that when the processed data is written to the main memory, the processed data in the first cache memory is erased or otherwise considered erased and available to be rewritten with new data.

In certain embodiments, the non-volatile memory further includes a third portion of the non-volatile memory configured as a second cache memory. The controller is configured such that when data stored in the main memory is written to the second cache memory for processing, the data in the main memory is erased or otherwise considered erased and available to be rewritten with new data. The controller is configured such that when the processed data is written to the main memory, the processed data in the second cache memory is erased or otherwise considered erased and available to be rewritten with new data.

In certain embodiments, the second portion of the non-volatile memory includes at least one memory device consisting of the group: Flash, resistive random access memory (ReRAM), and magnetoresistive random access memory (MRAM). The at least one memory device is configured to have higher data access performance than the first portion of the non-volatile memory.

In certain embodiments, the controller is configured as a centralized controller coupled to one or more memory cards having the non-volatile memory disposed thereon.

In certain embodiments, the controller is configured as a main controller. The SSD further includes one or more distributed controllers coupled to the main controller and the non-volatile memory. In certain embodiments, the one or more distributed controllers include: a first distributed controller configured to control the main memory; and a second distributed controller configured to control the first cache memory.

In certain aspects, another general implementation of a storage system includes: a host system; a first solid-state storage device (SSD) communicatively coupled to the host system; and a second SSD communicatively coupled to the host system. The first SSD includes: a first controller; and first non-volatile memory coupled to the first controller, wherein at least a portion of the first non-volatile memory is configured as a first main memory. The second SSD includes: a second controller; and second non-volatile memory coupled to the second controller. At least a portion of the second non-volatile memory is configured as a first cache memory. The first and second controllers are configured such that when data stored in the main memory is written to the first cache memory for processing, the data in the first main memory is erased or otherwise considered erased and available to be rewritten with new data.

In certain embodiments, the controller is configured such that when the processed data is written to the first main memory, the processed data in the first cache memory is erased or otherwise considered erased and available to be rewritten with new data.

In certain embodiments, the first non-volatile memory includes a second portion of the first non-volatile memory configured as a second cache memory.

In certain embodiments, the second non-volatile memory includes a second portion of the second non-volatile memory configured as a second main memory.

In certain embodiments, the second non-volatile memory includes a second portion of the second non-volatile memory configured as a second cache memory.

In certain embodiments, the storage system further includes a third SSD communicatively coupled to the host system. The third SSD includes: a third controller; and a third non-volatile memory coupled to the third controller, wherein at least a portion of the third non-volatile memory is configured as a second cache memory. The first and third controllers are configured such that when data stored in the main memory is written to the second cache memory for processing, the data in the first main memory is erased or otherwise considered erased and available to be rewritten with new data. The first and third controllers are configured such that when the processed data is written to the first main memory, the processed data in the second cache memory is erased or otherwise considered erased and available to be rewritten with new data.

In certain embodiments, the portion of the second non-volatile memory that is configured as the first cache memory comprises at least one memory device consisting of the group: Flash, resistive random access memory (ReRAM), and magnetoresistive random access memory (MRAM); and wherein the at least one memory device is configured to have higher data access performance than the portion of the first non-volatile memory that is configured as the main memory.

In certain embodiments, at least one of the first and second controllers is configured as a centralized controller coupled to one or more memory cards having the respective first or second non-volatile memory disposed thereon.

In certain embodiments, either the first or second controller is configured as a main controller, and wherein the respective first or second SSD further comprises one or more distributed controllers coupled to the main controller and the respective first or second non-volatile memory. In certain embodiments, the first non-volatile memory comprises a second portion of the first non-volatile memory configured as a second cache memory. The first controller is configured as a main controller. The first SSD further includes: a first distributed controller coupled to the main controller and the first non-volatile memory; and a second distributed controller coupled to the main controller and the first non-volatile memory. The first distributed controller is configured to control the main memory. The second distributed controller is configured to control the second cache memory.

In certain aspects, another general implementation of a method includes receiving, by a first solid-state storage device (SSD), a first command to write data to memory. The first SSD includes: a first controller; and first non-volatile memory coupled to the first controller. At least a portion of the first non-volatile memory is configured as a first cache memory. The method further includes: determining, by the first controller, that the data is stored in a main memory and is to be written to the first cache memory for processing; writing the data to the first cache memory; and erasing the data from the main memory or otherwise considering the data erased and available to be rewritten with new data.

In certain embodiments, the method further includes, after the processing of the data, writing the processed data to the main memory and erasing the data from the first cache memory or otherwise considering the data erased and available to be rewritten with new data.

In certain embodiments, the first non-volatile memory further includes a second portion of the first non-volatile memory configured as the main memory. The first controller performs: the writing of the data to the first cache memory; the erasing of the data from the main memory or the otherwise considering of the data as erased and available to be rewritten with new data; the writing of the processed data to the main memory; and the erasing of the data from the first cache memory or the otherwise considering of the data as erased and available to be rewritten with new data.

In certain embodiments, the portion of the first non-volatile memory that is configured as the first cache memory comprises at least one memory device consisting of the group: Flash, resistive random access memory (ReRAM), and magnetoresistive random access memory (MRAM); and wherein the at least one memory device is configured to have higher data access performance than the second portion of the first non-volatile memory that is configured as the main memory.

In certain embodiments, the method further includes: receiving, by the first SSD, a second command to read data from memory; determining, by the first controller, that the data is stored at a physical address located on either the main memory or the first cache memory; and reading the data from the physical address located on the respective main memory or first cache memory.

In certain embodiments, the first controller is configured as a main controller. The first SSD further includes a first distributed controller coupled to the main controller and the first non-volatile memory. The first distributed controller is configured to control the main memory. The first distributed controller performs: the erasing of the data from the main memory or the otherwise considering of the data as erased and available to be rewritten with new data; and the writing of the processed data to the main memory; and a second distributed controller coupled to the main controller and the first non-volatile memory. The second distributed controller configured to control the first cache memory. The second distributed controller performs: the writing of the data to the first cache memory; and the erasing of the data from the first cache memory or the otherwise considering of the data as erased and available to be rewritten with new data.

In certain embodiments, a second SSD is coupled to the first SSD. The second SSD includes: a second controller; and second non-volatile memory coupled to the first controller. At least a portion of the second non-volatile memory is configured as the main memory. The first controller performs: the writing of the data to the first cache memory; and the erasing of the data from the first cache memory or the otherwise considering of the data as erased and available to be rewritten with new data. The second controller performs: the erasing of the data from the main memory or the otherwise considering of the data as erased and available to be rewritten with new data; and the writing of the processed data to the main memory.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations, or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

Various components and modules described herein may include software, hardware, or a combination of software and hardware. The components and modules may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) may be provided via an article of manufacture including a non-transitory, tangible computer or machine-readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof. For example, the controllers described herein can include one or more processors (or processing units) that may be implemented as described above to execute the instructions. The term "processor" is used broadly herein and may include one or more processing units or circuitry, such as one or more embedded or non-embedded processors, microprocessors, hard and soft microprocessor cores, etc.

In an implementation, the processes and features described herein may be implemented as a series of executable modules run by a processor (e.g., in a computer system, individually, collectively in a distributed computing environment, embedded in a controller, etc.). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment A computer or machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.); or any type of medium suitable for storing, encoding, or carrying a series of instructions for execution by a processor to perform any one or more of the processes and features described herein. The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A storage system comprising:
 a host system;
 a first solid-state storage device (SSD) communicatively coupled to the host system, the first SSD comprising:
  a first controller; and
  first non-volatile memory coupled to the first controller, wherein the first non-volatile memory comprises at least one first partition of the first non-volatile memory that is configured as a first main memory;
 a second SSD communicatively coupled to the host system, the second SSD comprising:
  a second controller; and
  second non-volatile memory coupled to the second controller, wherein the second non-volatile memory comprises at least one first partition of the second non-volatile memory that is configured as a first cache memory;
 wherein the first and second controllers are configured to move data between the at least one first partition the first non-volatile memory configured as the first main memory and the at least one first partition of the second non-volatile memory configured as the first cache memory such that no copy of the data is retained in the partition that the data originated; and
 wherein the first and second controllers are configured such that when first data stored in the at least one first partition of the first non-volatile memory configured as the first main memory is written to the at least one first partition of the second non-volatile memory configured as the first cache memory for processing, the first data in the at least one first partition of the first non-volatile memory configured as the first main memory is erased or otherwise considered erased and available to be rewritten with new data; and
 a third SSD communicatively coupled to the host system, wherein the third SSD comprises:
  a third controller; and
  a third non-volatile memory coupled to the third controller, wherein the third non-volatile memory comprises at least one partition of the third non-volatile memory that is configured as a second cache memory;
 wherein the first, second, and third controllers are configured to move data between the at least one first partition of the first non-volatile memory configured as the first main memory, the at least one first partition of the second non-volatile memory configured as the first cache memory, and the at least one partition of the third non-volatile memory that is configured as the second cache memory such that no copy of the data is retained in the partition that the data originated;
 wherein the first and third controllers are configured such that when second data stored in the at least one first partition of the first non-volatile memory configured as the first main memory is written to the at least one partition of the third non-volatile memory configured as the second cache memory for processing, the second data in the at least one first partition of the first non-volatile memory configured as the first main memory is erased or otherwise considered erased and available to be rewritten with new data; and
 wherein the first and third controllers are configured such that when the processed second data is written to the at least one first partition of the first non-volatile memory configured as the first main memory, the processed second data in the at least one partition of the third non-volatile memory configured as the second cache memory is erased or otherwise considered erased and available to be rewritten with new data.

2. The storage system of claim 1, wherein the first and second controllers are configured such that when the processed first data is written to the at least one first partition of the first non-volatile memory configured as the first main memory, the processed first data in the at least one first partition of the second non-volatile memory configured as the first cache memory is erased or otherwise considered erased and available to be rewritten with new data.

3. The storage system of claim 1, wherein the first non-volatile memory comprises a second partition of the first non-volatile memory configured as a third cache memory.

4. The storage system of claim 1, wherein the second non-volatile memory comprises a second partition of the second non-volatile memory configured as a second main memory.

5. The storage system of claim 1, wherein the second non-volatile memory comprises a second partition of the second non-volatile memory configured as a third cache memory.

6. The storage system of claim 1, wherein the at least one first partition of the second non-volatile memory that is configured as the first cache memory comprises at least one memory device consisting of the group: Flash, resistive random access memory (ReRAM), and magnetoresistive random access memory (MRAM); and wherein the at least one memory device is configured to have higher data access performance than the at least one first partition of the first non-volatile memory that is configured as the main memory.

7. The storage system of claim 1, wherein at least one of the first and second controllers is configured as a centralized controller coupled to one or more memory cards having the respective first or second non-volatile memory disposed thereon.

8. The storage system of claim 1, wherein either the first or second controller is configured as a main controller, and wherein the respective first or second SSD further comprises one or more distributed controllers coupled to the main controller and the respective first or second non-volatile memory.

9. The storage system of claim 8, wherein the first non-volatile memory comprises a second partition of the first non-volatile memory configured as a third cache memory;
   wherein the first controller is configured as a main controller; and
   wherein the first SSD further comprises:
      a first distributed controller coupled to the main controller and the first non-volatile memory, wherein the first distributed controller is configured to control the at least one first partition of the first non-volatile memory configured as the main memory; and
      a second distributed controller coupled to the main controller and the first non-volatile memory, wherein the second distributed controller is configured to control the second partition of the first non-volatile memory configured as the third cache memory.

10. A storage system comprising:
   a first solid-state storage device (SSD) configured to communicatively couple to a host system, the first SSD comprising:
      a first controller; and
      first non-volatile memory coupled to the first controller, wherein the first non-volatile memory comprises at least one first partition of the first non-volatile memory that is configured as a first main memory;
   a second SSD configured to communicatively couple to the host system, the second SSD comprising:
      a second controller; and
      second non-volatile memory coupled to the second controller, wherein the second non-volatile memory comprises at least one first partition of the second non-volatile memory that is configured as a first cache memory;
   wherein the first and second controllers are configured to move data between the at least one first partition of the first non-volatile memory configured as the first main memory and the at least one first partition of the second non-volatile memory configured as the first cache memory such that no copy of the data is retained in the partition that the data originated; and
   wherein the first and second controllers are configured such that when first data stored in the at least one first partition of the first non-volatile memory configured as the first main memory is written to the at least one first partition of the second non-volatile memory configured as the first cache memory for processing, the first data in the at least one first partition of the first non-volatile memory configured as the first main memory is erased or otherwise considered erased and available to be rewritten with new data; and
   a third SSD configured to communicatively couple to the host system, wherein the third SSD comprises:
      a third controller; and
      a third non-volatile memory coupled to the third controller, wherein the third non-volatile memory comprises at least one partition of the third non-volatile memory that is configured as a second cache memory;
   wherein the first, second, and third controllers are configured to move data between the at least one first partition of the first non-volatile memory configured as the first main memory, the at least one first partition of the second non-volatile memory configured as the first cache memory, and the at least one partition of the third non-volatile memory that is configured as the second cache memory such that no copy of the data is retained in the partition that the data originated;
   wherein the first and third controllers are configured such that when second data stored in the at least one first partition of the first non-volatile memory configured as the first main memory is written to the at least one partition of the third non-volatile memory configured as the second cache memory for processing, the second data in the at least one first partition of the first non-volatile memory configured as the first main memory is erased or otherwise considered erased and available to be rewritten with new data; and
   wherein the first and third controllers are configured such that when the processed second data is written to the at least one first partition of the first non-volatile memory configured as the first main memory, the processed second data in the at least one partition of the third non-volatile memory configured as the second cache memory is erased or otherwise considered erased and available to be rewritten with new data.

11. The storage system of claim 10, wherein the first and second controllers are configured such that when the processed first data is written to the at least one first partition of the first non-volatile memory configured as the first main memory, the processed first data in the at least one first partition of the second non-volatile memory configured as the first cache memory is erased or otherwise considered erased and available to be rewritten with new data.

12. The storage system of claim 10, wherein the first non-volatile memory comprises a second partition of the first non-volatile memory configured as a third cache memory.

13. The storage system of claim 10, wherein the second non-volatile memory comprises a second partition of the second non-volatile memory configured as a second main memory.

14. The storage system of claim 10, wherein the second non-volatile memory comprises a second partition of the second non-volatile memory configured as a third cache memory.

15. The storage system of claim 10, wherein the at least one first partition of the second non-volatile memory that is configured as the first cache memory comprises at least one memory device consisting of the group: Flash, resistive random access memory (ReRAM), and magnetoresistive random access memory (MRAM); and wherein the at least one memory device is configured to have higher data access performance than the at least one first partition of the first non-volatile memory that is configured as the main memory.

16. The storage system of claim 15, wherein the first and second controllers are configured such that when the processed first data is written to the at least one first partition of the first non-volatile memory configured as the first main memory, the processed first data in the at least one first partition of the second non-volatile memory configured as the first cache memory is erased or otherwise considered erased and available to be rewritten with new data.

17. A method comprising:
receiving, by a storage system, a first command from a host system to enable processing of first data;
wherein the storage system comprises:
  a first solid-state storage device (SSD) configured to communicatively couple to a host system, the first SSD comprising:
    a first controller; and
    first non-volatile memory coupled to the first controller, wherein the first non-volatile memory comprises at least one first partition of the first non-volatile memory that is configured as a first main memory;
  a second SSD configured to communicatively couple to the host system, the second SSD comprising:
    a second controller; and
    second non-volatile memory coupled to the second controller, wherein the second non-volatile memory comprises at least one first partition of the second non-volatile memory that is configured as a first cache memory;
  wherein the first and second controllers are configured to move data between the at least one first partition of the first non-volatile memory configured as the first main memory and the at least one first partition of the second non-volatile memory configured as the first cache memory such that no copy of the data is retained in the partition that the data originated; and
  wherein the first and second controllers are configured such that when first data stored in the at least one first partition of the first non-volatile memory configured as the first main memory is written to the at least one first partition of the second non-volatile memory configured as the first cache memory for processing, the first data in the at least one first partition of the first non-volatile memory configured as the first main memory is erased or otherwise considered erased and available to be rewritten with new data; and
  a third SSD configured to communicatively couple to the host system, wherein the third SSD comprises:
    a third controller; and
    a third non-volatile memory coupled to the third controller, wherein the third non-volatile memory comprises at least one partition of the third non-volatile memory that is configured as a second cache memory;
  wherein the first, second, and third controllers are configured to move data between the at least one first partition of the first non-volatile memory configured as the first main memory, the at least one first partition of the second non-volatile memory configured as the first cache memory, and the at least one partition of the third non-volatile memory that is configured as the second cache memory such that no copy of the data is retained in the partition that the data originated;
  wherein the first and third controllers are configured such that when second data stored in the at least one first partition of the first non-volatile memory configured as the first main memory is written to the at least one partition of the third non-volatile memory configured as the second cache memory for processing, the second data in the at least one first partition of the first non-volatile memory configured as the first main memory is erased or otherwise considered erased and available to be rewritten with new data; and
  wherein the first and third controllers are configured such that when the processed second data is written to the at least one first partition of the first non-volatile memory configured as the first main memory, the processed second data in the at least one partition of the third non-volatile memory configured as the second cache memory is erased or otherwise considered erased and available to be rewritten with new data;
determining, by the storage system, that the first data is stored in the at least one first partition of the first non-volatile memory configured as the main memory and is to be written to the at least one first partition of the second non-volatile memory configured as the first cache memory for processing;
writing, by the second controller, the first data to the at least one first partition of the second non-volatile memory configured as the first cache memory; and
erasing, by the first controller, the first data from the first partition of the first non-volatile memory configured as the main memory or otherwise considering the first data erased and available to be rewritten with new data.

18. The method of claim 17, further comprising:
receiving, by the storage system, a second command from a host system to enable processing of second data;
determining, by the storage system, that the second data is stored in the at least one first partition of the first non-volatile memory configured as the main memory and is to be written to the at least one partition of the third non-volatile memory configured as the second cache memory for processing;
writing, by the third controller, the second data to the at least one partition of the third non-volatile memory configured as the second cache memory; and
erasing, by the first controller, the first data from the first partition of the first non-volatile memory configured as the main memory or otherwise considering the first data erased and available to be rewritten with new data.

19. The method of claim 17, further comprising:
processing the first data;
  writing, by the first controller, the processed first data to the at least one first partition of the first non-volatile memory configured as the first main memory; and
  erasing, by the second controller, the first data from the first partition of the second non-volatile memory configured as the first cache memory or otherwise considering the first data erased and available to be rewritten with new data.

20. The method of claim 17, wherein the first non-volatile memory comprises a second partition of the first non-volatile memory configured as a third cache memory.

21. The method of claim 17, wherein the second non-volatile memory comprises a second partition of the second non-volatile memory configured as a second main memory.

22. The method of claim 17, wherein the second non-volatile memory comprises a second partition of the second non-volatile memory configured as a third cache memory.

23. The method of claim 17, wherein the at least one first partition of the second non-volatile memory that is configured as the first cache memory comprises at least one memory device consisting of the group: Flash, resistive random access memory (ReRAM), and magnetoresistive random access memory (MRAM); and wherein the at least one memory device is configured to have higher data access performance than the at least one first partition of the first non-volatile memory that is configured as the main memory.

24. The method of claim 23, wherein the first and second controllers are configured such that when the processed first data is written to the at least one first partition of the first non-volatile memory configured as the first main memory, the processed first data in the at least one first partition of the second non-volatile memory configured as the first cache memory is erased or otherwise considered erased and available to be rewritten with new data.

* * * * *